May 3, 1966 J. W. GUSTAFSON ETAL 3,249,845

60 TO 400 CYCLE ERROR SIGNAL CONVERTER

Filed Dec. 21, 1961

3 Sheets-Sheet 1

INVENTORS
JAMES E. MORRIS
CLAUDE D. WEZEMAN
JOHN W. GUSTAFSON
BY
ATTORNEY

60 TO 400 CYCLE ERROR SIGNAL CONVERTER

Filed Dec. 21, 1961

United States Patent Office 3,249,845

Patented May 3, 1966

3,249,845

60 TO 400 CYCLE ERROR SIGNAL CONVERTER

John W. Gustafson, La Crescenta, James E. Morris, Granada Hills, and Claude D. Wezeman, Los Angeles, Calif., assignors to General Precision, Inc., a corporation of Delaware Filed Dec. 21, 1961, Ser. No. 161,234
2 Claims. (Cl. 321—61)

This invention relates to frequency converters, and more particularly to novel and improved circuitry for converting a first frequency signal into a second frequency signal with a relatively corresponding amplitude.

It is often desirable to convert an A.C. signal of a certain amplitude into a signal of another frequency but with a corresponding amplitude. For example, it may be desired to convert a 60 cycle servo error signal into a 400 cycle error signal to control a 400 cycle servo system. Because of the high cost of servo components it may be economically impractical to convert the entire system to operate on one frequency. The simple and inexpensive circuitry embodied in this invention may be utilized to convert the 60 cycle error signal into a 400 cycle error signal of corresponding amplitude to effect an economical and practical conversion stage.

Briefly described, the circuitry embodied in this invention accepts a signal of one frequency, divides it into two identical signals, each separated 180 degrees in phase and introduces each of the identical signals to a chopper operating at the desired second frequency. The chopper grounds portions of each of the signals which, when subsequently combined, form a signal of the desired second frequency but which is deformed. The deformation is eliminated by a similar operation of dividing the signal and chopping at the frequency of the original input signal. When the remaining signals are subsequently combined, the resulting output signal is at the desired second frequency and of an amplitude approximating the amplitude of the input signal.

One object of this invention is to provide circuitry for converting a signal of one frequency into a signal of another frequency and of corresponding amplitude.

Other objects of the invention will become apparent from a consideration of the following specification and claims, taken together with the accompanying drawings in which:

Figure 1:
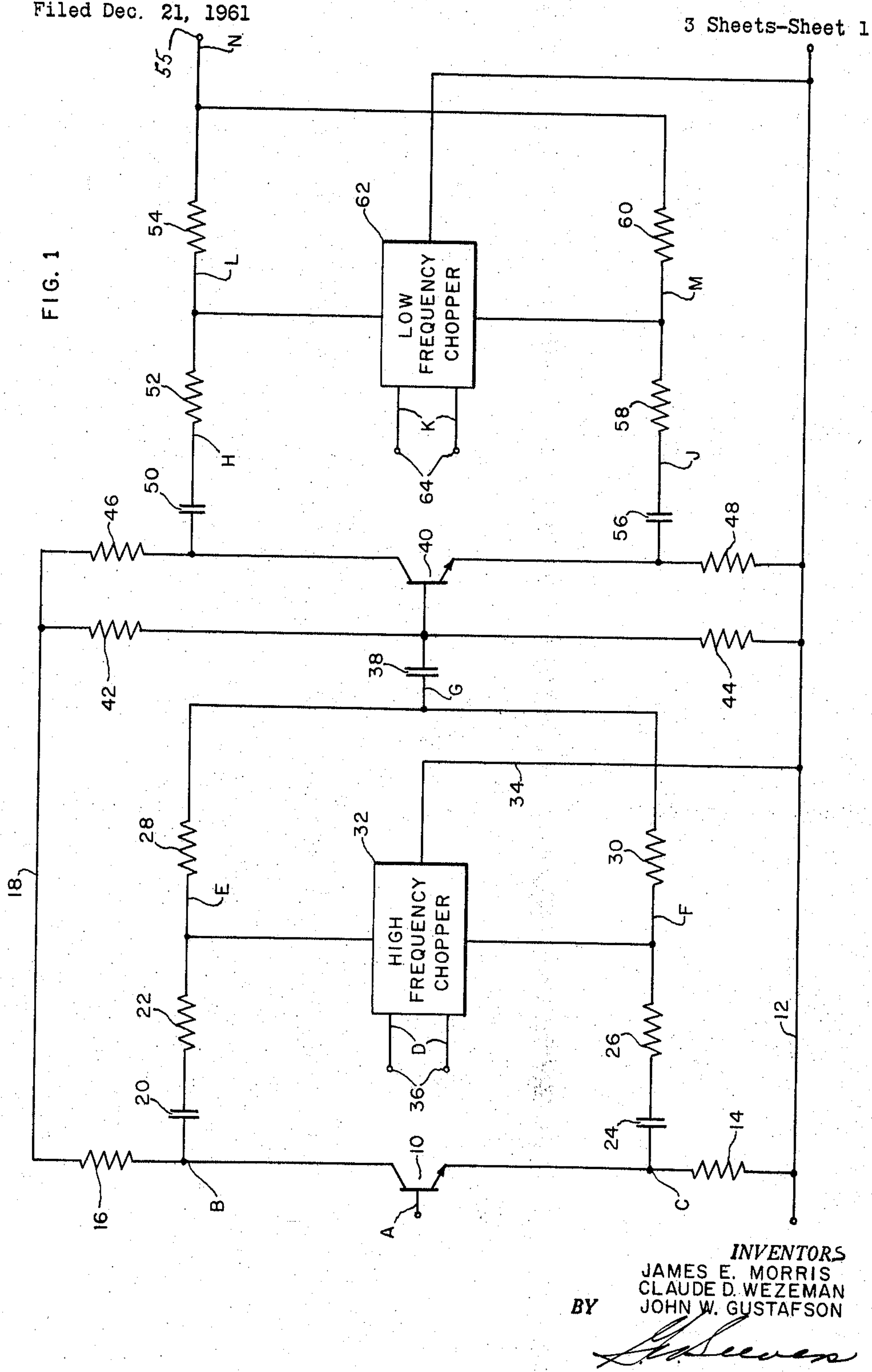
FIGURE 1 is a schematic diagram of circuitry embodying this invention.

Turning to a detailed description of the circuit illustrated in FIGURE 1, the input signal is applied between the base of transistor 10 and common line 12. The emitter of transistor 10, which may be a type 2N697 NPN transistor, is coupled to common line 12 through a resistance 14 which may have a value of 2.7K ohms. The collector of transistor 10 may be coupled through resistance 16, which may have a value of 2.7K ohms, to +B line 18, which may be at a potential of 27 volts.

Transistor 10 serves to divide the incoming signal into two identical signals each separated 180 degrees in phase. One of the signals is taken from the collector of transistor 10; the other signal is taken from the emitter of transistor 10. Coupled to the collector of transistor 10 is a capacitor 20 which may have a value of 6 microfarads. The other terminal of capacitor 20 is connected to a resistance 22 which may have a value of 4.7K ohms. Similarly, the emitter of transistor 10 is connected to a capacitance 24, which may have a value of 6 microfarads, the other terminal of which is connected to resistance 26 which may have a value of 4.7K ohms. The other terminals of resistances 22 and 26 are connected together through series resistances 28 and 30, respectively, each of which may have a value of 4.7K ohms.

The junction of resistance 22 and 28 and the junction of resistances 26 and 30 are connected to chopper 32. Chopper 32 may be any well known type of electro-mechanical or solid state chopper. If, for example, chopper 32 is an electro-mechanical chopper, each of the connections from the junction of resistances 22 and 28 and resistances 26 and 30 would be made to the stationary contacts of the chopper and the vibrating armature would be connected through line 34 to common line 12. Chopper 32 is caused to operate at the desired output frequency in a conventional manner as by introducing a sample of the desired output frequency into chopper exitation terminals 36.

The output of this stage is taken from the junction of resistances 28 and 30 and is introduced through capacitance 38, which may have a value of 1 microfarad, to the base of transistor 40, which may be a type 2N697 NPN transistor. In order to provide proper bias for transistor 40, the base may be connected to +B line 18 through a resistance 42, which may have a value of 22K ohms, and to common line 12 through a resistance 44, which may have a value of 10K ohms. The collector of transistor 40 may be connected to +B line 18 through a resistance 46, which may have a value of 2.7K ohms and the emitter of transistor 40 may be connected to common line 12 through resistance 48 which may have a value of 2.7K ohms. As previously discussed in connection with transistor 10, transistor 40 serves to divide its input signal into two identical signals displaced from each other by an angle of 180 degrees. One of the signals is taken from the collector of transistor 40 through the series network comprised of capacitance 50, resistance 52 and resistance 54. The other signal is taken from the emitter of transistor 40 through the series network comprised of capacitance 56, resistance 58 and resistance 60. The other terminals of resistances 54 and 60 are connected together to form output terminal 55 of the circuit, capacitances 50 and 56 are identical and may have a value of 1 microfarad; resistances 52 and 58 may have values of 4.7K ohms; resistances 54 and 60 may have resistances of 3.9K ohms. A conventional solid state or electro-mechanical chopper 62 is connected between the junction of resistances 52 and 54 and the junction of resistances 58 and 60. If an electro-mechanical chopper is used these junctions are connected to the stationary contacts of the chopper and the vibrating armature of chopper 62 would be connected to common line 12. Chopper 62 operates at the same frequency as the input applied to transistor 10, a sample of which is applied to chopper exitation terminals 64.

Figure 2:
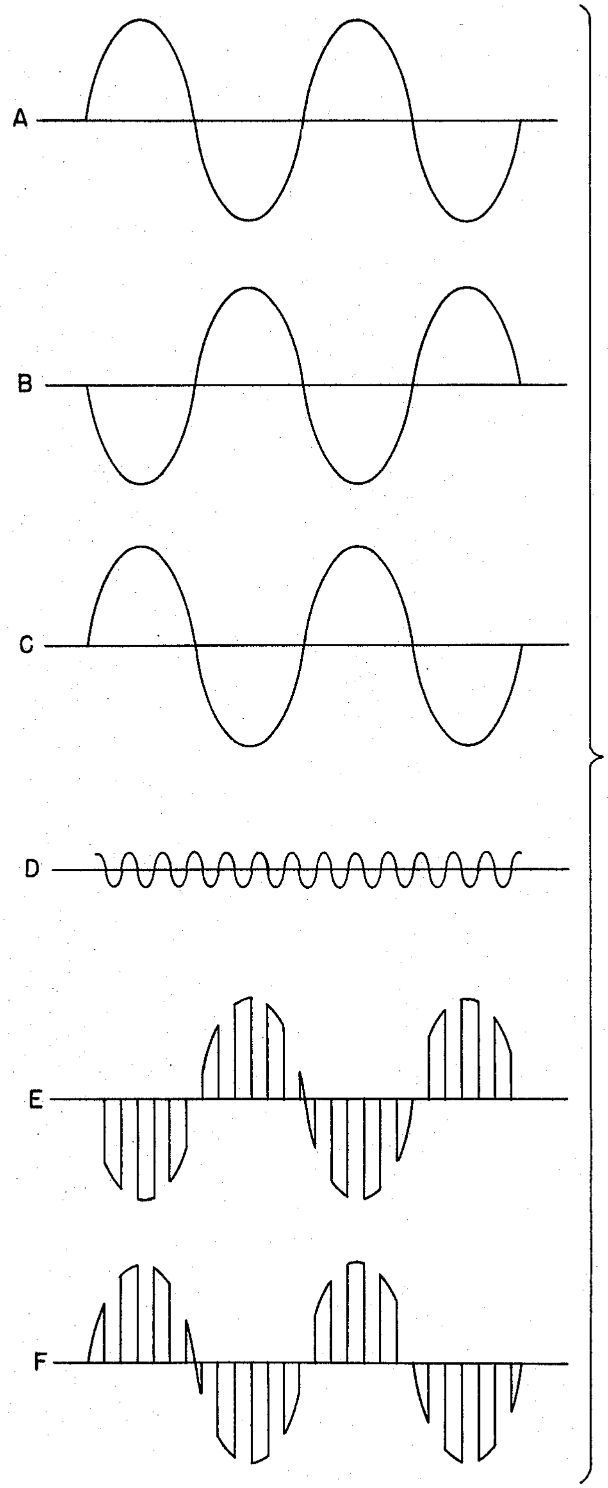
FIGURES 2 and 2A are diagrams showing typical waveforms at various points in the circuit of FIGURE 1.
Figure 2A:
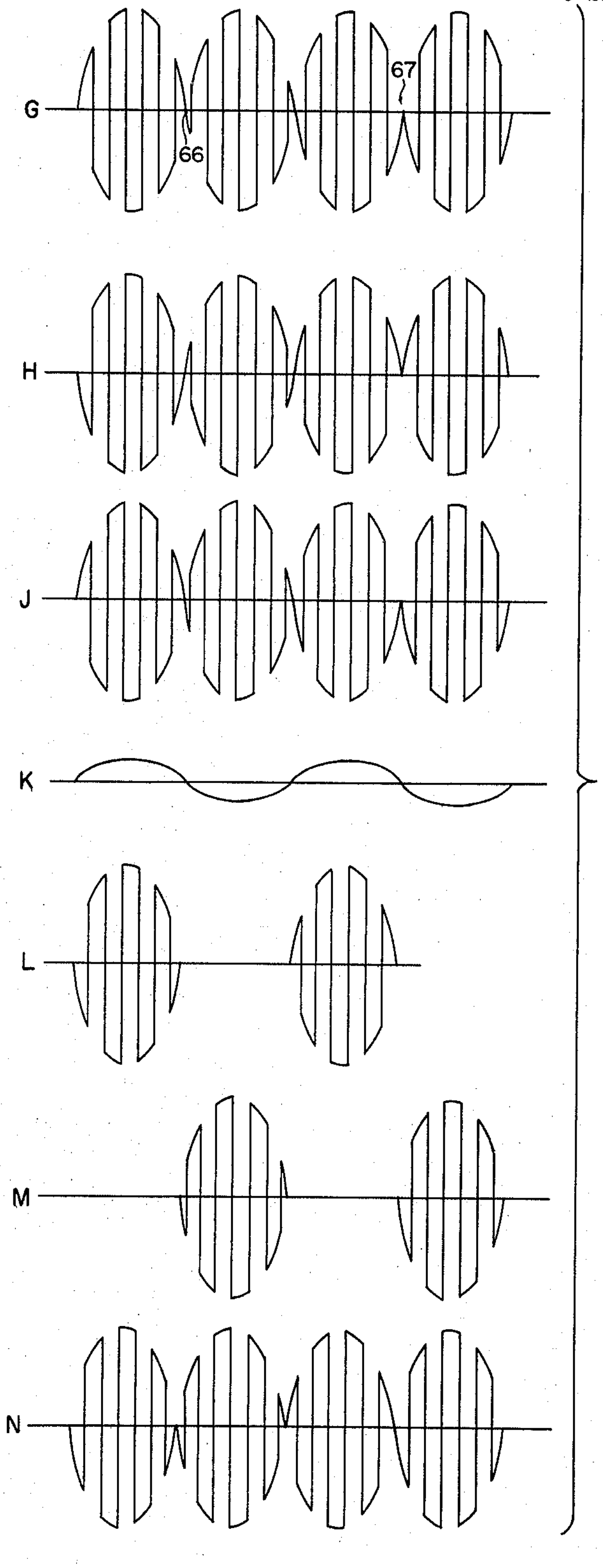

The operation of the circuit of FIGURE 1 can best be understood by referring to the waveforms of FIGURES 2 and 2*a*. Various points of the circuit of FIGURE 1 are marked with letters; the correspondingly lettered waveform of FIGURES 2 and 2*a* will appear at that particular point in the circuit of FIGURE 1. For example, waveform A of FIGURE 2 represents a 60 cycle input signal applied at point A to the base of transistor 10 of FIGURE 1. Transistor 10 serves to divide the input signal into two identical signals 180 degrees out of phase with each other. Thus, the signal appearing at the collector of transistor 10 is illustrated at B of FIGURE 2, and the signal appearing at the emitter of transistor 10 is illustrated at C of FIGURE 2. As has previously been discussed, chopper 32 of FIGURE 1 operates at the desired higher frequency output. To excite chopper 32 the higher frequency which may be 400 cycles, as shown at D in FIGURE 2, is introduced to terminals 36 of FIGURE 1. Chopper 32 will ground portions of waveforms B and C in accordance with its high frequency operation and will leave the ungrounded portions of waveforms B and C as shown in E and F of FIGURE 2. Waveforms E and F are added at point G of FIGURE 1 to produce waveform G of FIGURE 2*a*.

It can be seen from G in FIGURE 2*a* that the waveform is distorted at the nodes. At node 66, for example, the waveform is positive immediately before the node is reached and again turns positive after the node is reached. Similarly, at node 67 the waveform is negative immediately before the node is reached and again negative immediately after the node is reached. This distortion is eliminated by introducing the signal of waveform G to the base of transistor 40 of FIGURE 1 where the signal is again divided into two identical signals each displaced 180 degrees in phase. The signal appearing at the collector of transistor 40 is shown in waveform H of FIGURE 2*a* and the signal appearing at the emitter of transistor 40 is shown as waveform J. Chopper 62 of FIGURE 1 is adapted to ground portions of waveforms H and J of FIGURE 2*a*. Chopper 62 operates at the frequency of the input signal at point A and is illustrated as waveform K of FIGURE 2*a*. As the excitation voltage of waveform K swings positive the waveform J will be grounded; as the excitation voltage of waveform K swings negative the signal at point H will become grounded. The resulting signals at points L and M of FIGURE 1 are shown as waveforms L and M of FIGURE 2*a*. When waveforms L and M are added at point N of FIGURE 1 the resultant output between output terminal 55 and common line 12 will appear as waveform N in FIGURE 2A.

From waveform N it can be seen that the distortion described in waveform G has been eliminated and the proper phase relationship exists between each portion of the waveform. It should be understood that the curves illustrated in FIGURES 2 and 2*a* are theoretical representations of the signals appearing at the corresponding points of FIGURE 1. In practice, the limitations of the circuit parameters eliminate the sharp edges of the square waves and make the nodal points less pronounced. If the output circuit is coupled to subsequent circuitry by a transformer (not shown) waveform N of FIGURE 2*a* will appear to the subsequent circuitry to be a series of high frequency sine waves of which have approximately the same amplitude. It can be seen from the waveforms of FIGURES 2 and 2*a* that the output waveform N will increase in average amplitude as the low frequency input waveform A increases in amplitude and will reduce in average amplitude as waveform A reduces in amplitude.

It is to be understood that modifications may be made to the described circuitry, or frequencies other than those given in the example may be used without departing from the spirit of this invention as set forth in the following claims:

What is claimed is:

1. Electronic circuitry for converting a low frequency signal into a higher frequency signal of corresponding amplitude comprising: first phase dividing means for producing from the low frequency signal a pair of low frequency signals displaced 180° in phase from each other, first chopper means coupled to said first phase dividing means and operative at the frequency of the desired higher frequency signal for deleting from the waveforms of each of said pair of low frequency signals portions corresponding to the operating frequency of said first chopper means to form a pair of phase distorted higher frequency signals, first combining circuitry means coupled to said first chopper means for combining said pair of phase distorted higher frequency signals developed by said first chopper means, second phase dividing means coupled to said first combining circuit means for producing a pair of phase distorted signals displaced 180° in phase from each other, second chopper means coupled to said second phase dividing means and operative at the frequency of said low frequency signal for deleting from each of said pair of phase distorted high frequency signals portions corresponding to said frequency of said low frequency signal, second combining circuitry means coupled to said second chopper means for combining said pair of signals formed by said second chopper means into the desired higher frequency signal which corresponds in amplitude to the amplitude of said low frequency signal.

2. Electronic circuitry for converting a first frequency signal into a second frequency signal of corresponding amplitude comprising:

(A) first phase dividing means for producing from the first frequency signal a pair of signals displaced 180° in phase from each other, (B) first chopper means coupled to said first phase dividing means and operative at the frequency of the second frequency signal for deleting from the waveforms of each of said pair of first frequency signals portions corresponding to the operating frequency of said first chopper means to form a pair of phase distorted second frequency signals, (C) first combining circuitry means coupled to said first chopper means for combining said pair of phase distorted second frequency signals developed by said first chopper means, (D) second phase dividing means coupled to said first combining circuit means for producing a pair of phase distorted signals displaced 180° in phase from each other, (E) second chopper means coupled to said second phase dividing means and operative at the frequency of said first frequency signal for deleting from each of said pair of phase distorted second frequency signals portions corresponding to said frequency of said first frequency signal, and (F) second combining circuitry means coupled to said second chopper means for combining said pair of signals formed by said second chopper means into the second frequency signal which corresponds in amplitude to the amplitude of said first frequency signal.

References Cited by the Examiner

UNITED STATES PATENTS

| | | | |
|---|---|---|---|
| 2,777,066 | 1/1957 | Brockman | 321—65 |
| 2,840,712 | 6/1958 | Hemphill et al. | 321—65 |
| 3,061,742 | 10/1962 | Harrison | 307—88.5–9 |

LLOYD McCOLLUM, *Primary Examiner.*

MILTON O. HIRSHFIELD, G. J. BUDOCK, G. GOLDBERG, *Assistant Examiners.*